INVENTOR
Albert W. Townsend
BY Lawrence Jr Winter
ATTORNEY 3,168,339
BALL AND SOCKET JOINTS
Albert W. Townsend, Leamington Spa, England, assignor to Automotive Products Company Limited, Leamington Spa, England
Filed Nov. 2, 1962, Ser. No. 235,079
Claims priority, application Great Britain, Nov. 27, 1961, 42,333/61
1 Claim. (Cl. 287—87)

This invention relates to ball and socket joints of the kind commonly used in the steering linkage of motor vehicles and for like purposes.

It has already been proposed in ball and socket joints to interpose a bushing of synthetic plastic material between the bearing surfaces of the ball and the socket. In the particular construction of ball and socket joints of this kind and with which the present invention is concerned, and herein after referred to as "ball and socket joints of the kind referred to" the socket interior which receives the ball is substantially cylindrical, the ball being disposed between two bushes referred to as the upper and lower bearing bushes, the upper bearing bush consisting of a bush of annular form disposed between the upper portion of the ball from which the ball pin extends and the surrounding wall portion of the socket interior and a lower bearing bush which may also be of annular form and which is spring loaded the spring action applying an axial load to maintain the ball and the bearing bushes in contact. With this particular form of ball and socket joint as now constructed, the lower bearing bush does not assist in supporting the steering or other load to which the joint is subjected because a substantial clearance has to be provided between the outer periphery of the lower bearing bush and the surrounding wall portion of the socket to ensure an easy sliding fit in the axial direction, under the spring action.

The present invention has therefore for its object to provide a ball and socket joint of the kind referred to wherein the lower bearing bush will support part of the load, for example a steering load to which the ball and socket joint is subjected. To this end, in accordance with the present invention it is proposed to form the lower bearing bush in at least two portions wholly or partially separated from one another and provide a nominal clearance between the outer periphery of the bearing bush and the surrounding wall portion of the socket so that the spring loading urging the bearing bush into contact with the ball will tend to cause separation of the bearing bush portions. This has the result that the bearing surfaces of the bearing bush and socket wall will be maintained in contact without applying pressure sufficient to prevent axial sliding movement of the bearing bush in the socket. Thus as the lower bearing bush is maintained in contact with the wall of the socket it will support some of the load to which the joint is subjected thus providing a larger load bearing area than hitherto. Instead of forming the lower bearing bush as two portions the same can be formed from a number of circular ring sectors. Further, the portions of the bush can be completely separated from one another, or only partially separated from one another for example by cutting for a predetermined distance through the thickness of the bush, the bush in this latter construction being suitable more particularly to a bush of "nylon" or other synthetic plastic material of a similar resilient nature. The bearing bush can be made from any suitable material. For example the same can be moulded or otherwise formed from a resilient synthetic plastic material, having for preference self-lubricating characteristics. An acetal resin for example material known under the trade name "Delrin" can also be used for the production of the bearing bush.

An embodiment of the invention will now be described by way of example by aid of the accompanying drawings in which.

Figure 1:
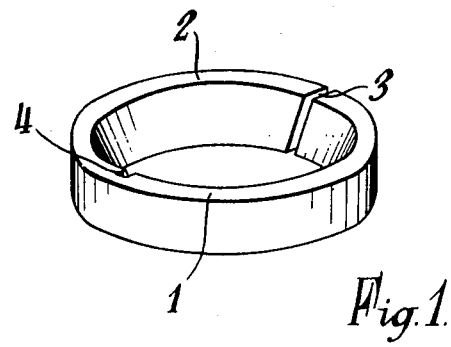
FIGURE 1 is a perspective view of a lower bearing bush.

Referring to FIGURE 1 of the accompanying drawings the lower bearing bush, which can be formed from a resilient synthetic plastic material having self-lubricating properties, is of annular form and consists of two semicircular portions 1 and 2 completely separated from one another by a gap 3 at one point and partially separated at a point diametrically opposite to the gap by a groove 4 extending into the thickness of the bush from the inner diameter. The weakened section provided by the groove 4 increases the flexibility of the bush. The outer peripheral wall of the bush is parallel to the axis of the bush whilst the inner peripheral wall which contacts the ball of the joint extends at an angle to such axis to provide a conical seating for the ball of the joint.

Figure 2:
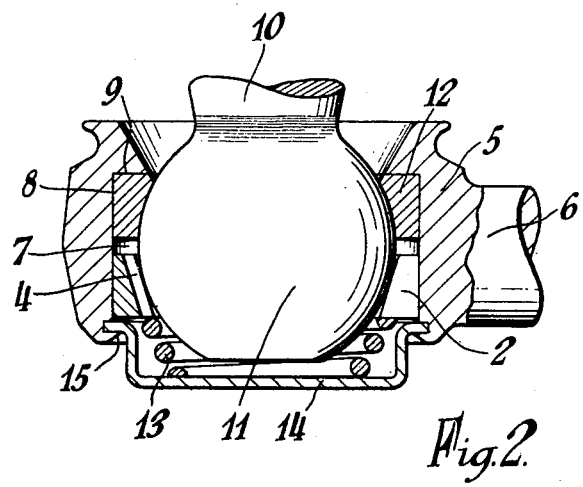
FIGURE 2 shows in section a ball and socket joint incorporating the lower bearing bush shown in FIGURE 1.

The bush described above is shown in FIGURE 2 incorporated in a ball and socket joint for use for example in a vehicle steering mechanism. The ball and socket joint comprises a socket 5 formed integral with a tie rod 6. The socket 5 has an open ended substantially cylindrical bore 7 which is of reduced diameter at one end referred to as the upper end 8, to provide an internal shoulder 9 in the cylindrical bore adjacent said upper end. The ball pin 10 of the joint is assembled in the socket with the ball 11 disposed within the cylindrical bore 7 and the pin extending outwardly thereof through the upper end. An annular bush referred to as the upper bearing bush 12 which may also be of synthetic plastic material having self-lubricating properties is interposed between the upper peripheral portion of the ball 11 and the surrounding wall portion of the socket bore. The outer end of the upper bearing bush 12 bears against the internal shoulder 9 and the length of same is not greater than half the length of the cylindrical bore. The lower bearing bush constructed as described above is assembled in the cylindrical bore of the socket and spring loaded by a compression spring 13 one end of which bears against the outer end of the bush portions whilst the other end bears against an end cap 14 closing the open end of the socket the end cap being secured in position by deforming or otherwise turning over the metal of the socket onto the peripheral flange of the end cap as shown at 15. The lower bearing bush is formed so that the outside diameter provides a nominal clearance for example .002" with the diameter of the cylindrical bore and also to provide a gap between the adjacent ends of the lower and upper bearing bushes. Thus the spring loading tends to urged the lower bearing bush axially in an inward direction in the socket with the result that the portions of the bearing bush are urged outwardly the bearing surfaces of the lower bearing bush, ball periphery and socket being maintained in contact.

In constructing the lower bearing bush for a ball and socket joint according to the invention, the surface of the bush in contact with the ball can be formed during manufacture of the bush as a spherical surface conforming to the ball periphery. Alternatively the same can be non-spherical and adapted upon assembly and/or under operating conditions to be deformed to conform to the ball periphery. For example the bearing bush can be formed as shown in FIGURE 1 to provide a substantially conical seating for the ball the conical surface deforming under load to conform to the ball periphery.

It will be appreciated that the lower bearing bush must be constructed so that the same does not embrace the ball to an extent which would prevent or restrain the axial movement. It would appear that there is an optimum position for the lower bearing bush, the maximum wedging action with slidability of the bearing bush being governed, it is believed by a function of the tangent the bearing surface of the bush makes with the periphery of the ball.

It will be appreciated that the lower bearing bush can be formed in more than two portions. For example the same can be formed as a number of circular ring sectors. Further the portions of the bush can be completely separated from one another or only partially separated from one another for example by cutting for a predetermined distance through the thickness of the bush. The bush can be made of "nylon" or any other synthetic plastic material, having for preference self-lubricating properties. An acetal resin can be used, one such material being the material known by the trade name "Delrin." In addition the material from which the bush is made can incorporate additives for the purpose of reducing the coefficient of friction and increasing dimensional stability. For example, molybdenum disulphide, graphite, silicones or polytetrafluorethylene (PTFE) either singly or in any combination thereof can be incorporated in the material.

I claim:

A ball and socket joint comprising a socket with a cylindrical bore and an open end, an annular inwardly extending shoulder formed in said bore adjacent said open end, a ball pin disposed in said bore with the pin extending outwardly through said open end, an upper annular bearing bush disposed in said bore between the ball and said shoulder and bearing thereagainst, said upper bush surrounding said ball and interposed between said bore and ball periphery, a lower annular bearing bush having an outer periphery extending parallel to the inner periphery of said bore, the inner periphery of said lower bush bearing against the ball and extending at an angle to the main axis of said lower bush, and means for urging said lower bush in an axial direction toward said upper bush, said lower bush comprising a split ring with a longitudinal recess disposed in its inner periphery opposite the point it is split.

References Cited by the Examiner
UNITED STATES PATENTS

| | | | |
|---|---|---|---|
| 1,796,009 | 3/31 | Dunn | 287—87 X |
| 2,115,087 | 4/38 | Schaefer. | |
| 3,004,786 | 10/61 | Herbenar. | |

OTHER REFERENCES

Delrin Acetal Resin, published June 1957 by Polychemicals Dept. of E. I. du Pont de Nemours and Co., Inc., Wilmington 98, Del.

German application 1,014,441, Aug. 22, 1957.

CARL W. TOMLIN, *Primary Examiner.*